United States Patent [19]

Emig et al.

[11] 4,151,145

[45] Apr. 24, 1979

[54] LATEX-MODIFIED, PRETENSIONED AND PRESTRESSED STRUCTURES HAVING ENHANCED STRUCTURAL LOAD BEARING CAPACITY

[75] Inventors: Gale L. Emig; Daniel Moldovan, both of Midland, Mich.

[73] Assignee: The Dow Chemical Company, Midland, Mich.

[21] Appl. No.: 853,950

[22] Filed: Nov. 22, 1977

[51] Int. Cl.$^2$ .................................................. C08K 3/00
[52] U.S. Cl. ............................ 260/29.6 S; 52/223 R; 52/309.16; 238/83; 238/84; 238/85; 238/91; 238/92; 260/42.13
[58] Field of Search .................... 52/223 R, 309.16; 238/83, 84, 85, 91, 92; 260/29.6 S, 42.13

[56] References Cited

U.S. PATENT DOCUMENTS

| | | | |
|---|---|---|---|
| 3,239,479 | 3/1966 | Roenicke et al. | 260/29.7 |
| 3,411,943 | 11/1968 | Bragg et al. | 117/70 |
| 3,773,700 | 11/1973 | Eash et al. | 260/29.6 S |
| 3,879,909 | 4/1975 | Lamoria et al. | 52/309.17 |
| 4,014,840 | 3/1977 | Emig et al. | 260/42.13 |
| 4,086,200 | 4/1978 | Lamoria et al. | 260/42.13 |

FOREIGN PATENT DOCUMENTS 967587  8/1964  United Kingdom ................ 260/29.6 S

OTHER PUBLICATIONS

Kaar et al. Influence of Concrete Strength on Strand Transfer Length, Portland Cement Association, Journal of Prestressed Concrete Institute, Oct. 1963.

*Primary Examiner*—Melvyn I. Marquis
*Attorney, Agent, or Firm*—Tai-Sam Choo

[57] ABSTRACT

This invention relates to a latex-modified, pretensioned, and prestressed concrete structure having at least about a 50% reduction in bond transfer length as compared to a structure not modified by a latex. Such structure is composed of a cured concrete composition comprising a mixture of (1) portland cement, (2) mineral aggregate, and (3) a vinylidene chloride polymer latex, said latex being present in an amount sufficient to provide from about 5 to about 25 percent by weight of polymer solids.

8 Claims, No Drawings

LATEX-MODIFIED, PRETENSIONED AND PRESTRESSED STRUCTURES HAVING ENHANCED STRUCTURAL LOAD BEARING CAPACITY

BACKGROUND OF THE INVENTION

This invention relates to latex-modified concrete structures. More specifically, this invention relates to latex-modified, pretensioned and prestressed concrete structures having enhanced structural load bearing capacity and adapted for applications in exterior construction work such as slabs, beams, arch ribs, girders, restraining walls, pavings, and columns, where excessive vibration and/or heavy load may be encountered. A preferred use of the structures of this invention is as railroad crossties. Such crossties advantageously replace wooden ties conventionally used to support rails on a railway roadbed composed of particulate ballast.

The present invention will more particularly be described hereinafter in terms of novel railroad crossties without intending to limit its scope.

Although wood ties have been and continue to be generally used in the railroad track construction and maintenance, other materials have been sought and suggested for use particularly where the inherent characteristics of wood make wood ties unsatisfactory or where the scarity or cost of suitable timber for wood ties makes substitute materials attractive. To this end, ties fabricated of prestressed concrete have been introduced.

The term "pretensioned, prestressed concrete" as used herein and generally in the art means reinforced concrete structures wherein the concrete is under compression and the reinforcing element such as steel is under tension. The reinforcing element is stressed or put under tension before the concrete is poured.

Although the prestressed concrete ties have solved many problems associated with wood ties, some new problems unique to the concrete ties have been encountered. More specifically, the concrete ties are extremely heavy or awkward to handle and are known to cause loss of electrical currents transmitted through the rails to control modern signal systems because of relatively low resistivity of concrete as compared to wood. One of the most serious problems associated with prestressed concrete railroad ties is cracking when such ties are subjected to flexural loading, i.e., when sufficient weight is applied to the ties to impart a flexural deformation thereof. In recent years, the cracking problem has further been aggravated with increasing speeds and loads of trains. Cracking of prestressed concrete is due primarily to the loss of prestressing force resulting from inadequate bond transfer from the prestressing reinforcing element such as steel to the surrounding concrete matrix. Because of the relatively high bond transfer length of prior known prestressed concrete crossties, a large number of relatively small prestressing steel wires or rods is required to achieve adequate bond transfer between the steel reinforcement and the concrete. The use of a large number of reinforcing wires or rods is commercially undesirable. Furthermore, it has been necessary to over-design concrete crossties in order to have good bond transfer between the steel wires or rods and the concrete, resulting in a crosstie design of excessive weight.

The term "bond transfer length" as used herein and generally in the art means the distance over which the stress in a pretensioned strand is transferred by bond to the surrounding concrete. When a good bond transfer exists between the strand and the concrete, the bond transfer length is relatively short, and vice versa.

Prestressed concrete structures have been known in the art for many years, e.g., as disclosed in U.S. Pat. Nos. 1,684,663; 2,080,074; 2,535,100 and 3,086,273. Railroad ties produced from prestressed concrete are also well known in the art, e.g., as disclosed in U.S. Pat. Nos. 2,538,443; 2,538,437; 2,695,754 and 3,687,346; as well as Polish Pat. No. 44,184 and Pakistanian Pat. No. 111,699.

Modification of portland cement compositions with vinylidene chloride polymer latexes of the type specified herein is disclosed in British Pat. No. 967,587. Additional prior art directed to the modification of portland cement compositions with vinylidene chloride polymer latexes include U.S. Pat. Nos. 2,819,239; 3,239,479; 3,411,943; 3,773,700; 3,879,909 and Ser. No. 815,967.

Heretofore, however, it has not been known to utilize portland cement compositions containing the herein specified types and amounts of vinylidene chloride latexes for the preparation of prestressed concrete structures having improved bond transfer between the concrete and reinforcing steel wires.

Accordingly, it is an object of this invention to provide prestressed concrete structures, e.g., railroad crossties, having improved bond transfer between prestressing reinforcing elements, such as, for example, steel wires, and concrete which structure is lighter in weight, has enhanced structural load bearing capacity, and can be fabricated with fewer prestressing elements having relatively large crosssectional area. Other objects and advantages of the invention will become apparent in the following description.

SUMMARY OF THE INVENTION

The objects of this invention are obtained by a latex-modified, pretensioned, and prestressed concrete structure, having at least about a 50% reduction in bond transfer length as compared to a structure not modified by a latex, composed of a cured concrete composition comprising a mixture of (1) portland cement, (2) mineral aggregate, and (3) a vinylidene chloride polymer latex, said latex being present in an amount sufficient to provide from about 5 to about 25 percent by weight of polymer solids.

It has been found that such structure is lighter in weight than prior known prestressed concrete structures without sacrificing its physical properties and can be made using fewer reinforcing elements having relatvely large cross-sectional area.

Further, such concrete structure has an improved resistance to cracking when subjected to vibration and cyclic-load.

It is believed that the above advantages are attributable, at least in part, to improved bond transfer between the reinforcing element such as steel wires and concrete modified by vinylidene chloride polymer latex.

DETAILED DESCRIPTION AND EMBODIMENTS OF THE INVENTION

By the "vinylidene chloride polymer latex" as used herein is meant any aqueous collodial dispersion of an organic interpolymer composed of from about 35 to about 90 parts by weight of vinylidene chloride and from about 65 to about 10 parts by weight of at least one other interpolymerized material of the general formula:

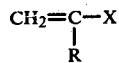

wherein "R" is selected from the group consisting of hydrogen and the methyl group and "X" is selected from the group consisting of —CN, halogens of atomic numbers 9 to 35, and ester-forming groups, —COOY, wherein "Y" is selected from the group consisting of a primary alkyl group and a secondary akyl group, each of the foregoing alkyl groups containing from 1 to 18 carbon atoms inclusively.

Exemplary of such interpolymerizable monomeric materials are: methyl acrylate, ethyl acrylate, propyl acrylate, isopropyl acrylate, butyl acrylate, isobutyl acrylate, sec.-butyl acrylate, tert.-butyl acrylate, amyl acrylate, isoamyl acrylate, tert.-amyl acrylate, hexyl acrylate, 2-ethylhexyl acrylate, cyclohexyl acrylate, octyl acrylate, 3,5,5-trimethylhexyl acrylate, decyl acrylate, dodecyl acrylate, octadecenyl acrylate, methyl methacrylate, ethyl methacrylate, 2-ethylbutyl methacrylate, octyl methacrylate, phenyl methacrylate, cyclohexyl methacrylate, 3,5,5-trimethylhexyl methacrylate, decyl methacrylate, dodecyl methacrylate, and octadecyl methacrylate and butoxyethyl acrylate or methacrylate or other alkoxyethyl acrylates or methacrylates, vinyl halides, (e.g., vinyl chloride, vinyl bromide, etc.), acrylonitrile, methacrylonitrile, and the like.

Representative types of water-insoluble vinylidene chloride-containing interpolymers which have been discovered to be highly satisfactory for use as the latex components employed in the superior latex-modified portland cement concrete compositions prescribed by the present invention include the interpolymers designated in the following Table I:

TABLE I

| Vinylidene Chloride Interpolymer Compositions | | | | | | | | | | | |
|---|---|---|---|---|---|---|---|---|---|---|---|
| Organic Monomer Components | Parts by Weight | | | | | | | | | | |
| Vinylidene Chloride | 40 | 60 | 89 | 90 | 50 | 88 | 50 | 52 | 70 | 75 | 75 | 75 |
| Vinyl Chloride | | | | | | | 40 | 35 | 20 | 20 | 20 | 20 |
| Ethyl Acrylate | 60 | 40 | | | 40 | 7 | 10 | | 10 | 5 | | 5 |
| Methyl Methacrylate | | | | 10 | 10 | | | | | | | 2 |
| 2-Ethylhexyl Acrylate | | | | | | | | 13 | | | | |
| Acrylonitrile | | | 11 | | | 5 | | | | | 5 | |

Of particular benefit in the preparation of the exceptionally strong, latex-modified portland cement concrete compositions of the present invention is the interpolymer latex containing about 75 parts by weight of interpolymerized vinylidene chloride, about 20 parts by weight of interpolymerized vinyl chloride, about 5 parts by weight of interpolymerized ethyl acrylate, and about 2 parts by weight of interpolymerized methyl methacrylate.

The concrete compositions of this invention may also beneficially contain therein, as an additive, from aboyt 2.5 to about 10 parts by weight of a polyelectrolyte having a number average molecular weight of less than about 3000 and consisting essentially of 3 parts by weight of methyl methacrylate and about 1 part by weight of a sulfoester of a α-methylene carboxylic acid or its salt having the formula

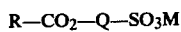

wherein the radical R is selected from the group consisting of vinyl and α-substituted vinyl, and the radical —Q— is a divalent hydrocarbon radical having its valence bonds on a different carbon atom, and M is a cation.

The cement referred to may be selected from the group of inorganic settable materials, such as hydraulic, portland, natural, or aluminous cement.

The mineral aggregate used may be stone, gravel, pebbles, granite, carborundum, aluminum oxide, emery, marble chips, sawdust, cinders or other aggregate commonly employed in cement concrete. The intended end use of the cement system can undoubtedly serve as a guide to those skilled in the art as to the choice of preferred particle size of the aggregate material to be used.

The reinforcing element referred to may be rods, wires, or ribbons of steel. Other metals and rigid plastics may also be used. When steel is used, it is advantageous to have the surface thereof free of oxide layers and other surface contaminants. Preferred sizes and placements of steel reinforcing elements are indicated in specific examples described herein below.

The latex-modified portland cement concrete compositions described herein can be cured using any of well known methods. However, the concrete composition can advantageously be cured immediately upon addition of the vinylidene chloride latex modifier without need to control the rate of temperature increase. Further, the temperatures used, the duration of exposure to such temperature will depend somewhat upon the cement composition employed. In any event, exposure to dry heat at temperatures in the range of from at least about 100° F. to 200° F., for a period of at least about 4 hours is generally required. For longer cure times, preferred temperatures are generally in the range of from about 200° F. to 210° F.

Bond transfer length of the latex-modified, pretensioned, and prestressed concrete structures of this invention is determined in accordance with ASTM C-234-62. Such structures have at least about 50% reduction in bond tranfer length as compared to those not modified by a latex.

The examples that follow illustrate the invention but are not to be taken as limiting its scope.

EXAMPLE 1

Several portland cement concrete compositions were prepared using the formulations shown hereinbelow. The concrete compositions of this invention were modified with a polymeric latex containing about 50 percent by weight of interpolymer solids having the following compositions:

75 parts by weight vinylidene chloride 20 parts by weight vinyl chloride 5 parts by weight ethyl acrylate 2 parts by weight methyl acrylate

| Concrete Composition of this Example | |
|---|---|
| Material | Weight (lb.) |
| Gravel Aggregate (⅜″ max. size) | 164 |
| Concrete Sand | 246 |
| Huron Type I Portland Cement | 100 |
| Interpolymer Latex (solids) | 15 |
| Water (including water in latex) | 35 |
| Silicone Antifoamer | 0.4 |

Latex-modified, prestressed concrete crossties were prepared by pouring different portland cement concrete mixtured described above into a mold cavity containing pretensioned, reinforcing steel strands and subsequently curing the mixtures in the mold. Each individual strand had a diameter of ¼ inch or ⅜ inch and was pretensioned to a value of 189,000 psi.

The concrete mixtures were prepared in a suitable, prewet mixer using the following procedure: gravel aggregate were added to the mixer followed by water, latex or both; the resulting slurry was mixed for one minute in the mixer followed by the addition of sand and cement; the admixture was then mixed for three minutes and was allowed to stand for one and a half minutes; and the admixture was mixed for additional one and a half minutes and was poured into the mold.

The latex-modified concrete compositions of this Example were cured for five (5) hours while the surrounding air was being heated gradually from ambient temperature to a temperature of 155° F., followed by additional curing for 19 hours at that temperature.

Following the curing operation, the prestressed concrete crossties were released from the mold and were tested. Physical properties of crossties made in accordance with the teachings of the present invention are reported in Table II.

TABLE II

| | BOND TRANSFER LENGTH | | | | | |
|---|---|---|---|---|---|---|
| | ¼″ Strand | | | ⅜″ Strand | | |
| Test No. | Max. | Min. | Avg. | Max. | Min. | Avg. |
| 1.1 Control[1] | | | | | | |
| Cut End | 43.5 | 37.5 | 41.0 | 28.5 | 24.5 | 26.0 |
| Dead End | 36.0 | 32.0 | 34.5 | 25.5 | 20.0 | 22.5 |
| 1.2 This Invention[2] | | | | | | |
| Jacking End | 22.0 | 15.0 | 18.3 | 17.0 | 11.0 | 13.3 |
| Dead End | 19.0 | 14.0 | 16.5 | 15.0 | 10.0 | 12.0 |

[1]Non latex-modified, pretensioned, and prestressed railroad ties. Data from Portland Cement Association Bulletin D-71.
[2]Latex-modified, pretensioned, and prestressed railroad ties made according to the teachings of this invention.

From the results and data shown in Table II, it will be seen that, from Tests Nos. 1.1 and 1.2, that latex-modified, pretensioned, and prestressed concrete railroad ties have at least about 50% reduction in bond transfer length as compared to those ties not modified by a latex.

What is claimed is:

1. A latex-modified, pretensioned, and prestressed concrete structure, having at least about a 50% reduction in bond transfer length as compared to a structure not modified by a latex, composed of a cured concrete composition comprising a mixture of (1) portland cement, (2) mineral aggregate, and (3) a vinylidene chloride polymer latex, said latex being present in an amount sufficient to provide from about 5 to about 25 percent by weight of polymer solids and wherein said vinylidene chloride is an organic interpolymer composed of from about 35 to about 90 parts by weight of vinylidene chloride and from about 65 to about 10 parts by weight of at least one other interpolymerized material of the general formula:

$$CH_2=C-X$$
$$|$$
$$R$$

wherein "R" is selected from the group consisting of hydrogen and the methyl group and "X" is selected from the group consisting of —CN, halogens of atomic numbers 9 to 35, and ester-forming groups, —COOY, wherein "Y" is selected from the group consisting of a primary alkyl group and a secondary alkyl group, each of the foregoing alkyl groups containing from 1 to 18 carbon atoms inclusively.

2. The structure according to claim 1 wherein at least one metallic reinforcing member is embedded within said cured concrete composition.

3. The structure according to claim 2 wherein the reinforcing member is steel strand or rod.

4. The structure according to claim 1 wherein said organic interpolymer is composed of about 75 percent by weight vinylidene chloride, about 20 percent by weight vinyl chloride, about 5 percent by weight ethyl acrylate and about 2 percent by weight methyl methacrylate.

5. A latex-modified, pretensioned and prestressed railroad crosstie, having at least about 50 percent reduction in bond transfer length as compared to a structure not modified by a latex, composed of a cured concrete composition comprising a mixture of (1) portland cement, (2) mineral aggregate, and (3) a vinylidene chloride polymer latex, said latex being present in an amount sufficient to provide from about 5 to about 25 percent by weight of polymer solids and wherein said vinylidene chloride is an organic interpolymer composed of from about 35 to about 90 parts by weight of vinylidene chloride and from about 65 to about 10 parts by weight of at least one other interpolymerized material of the general formula:

$$CH_2=C-X$$
$$|$$
$$R$$

wherein "R" is selected from the group consisting of hydrogen and the methyl group and "X" is selected from the group consisting of —CN, halogens of atomic numbers 9 to 35, and ester-forming groups, —COOY, wherein "Y" is selected from the group consisting of a primary alkyl group and a secondary alkyl group, each of the foregoing alkyl groups containing from 1 to 18 carbon atoms inclusively.

6. The railroad crosstie according to claim 5 wherein at least one metallic reinforcing member is embedded within said cured concrete composition.

7. The railroad crosstie according to claim 6 wherein the reinforcing member is steel strand or rod.

8. The railroad crosstie according to claim 5 wherein said organic interpolymer is composed of about 75 percent by weight vinylidene chloride, about 20 percent by weight vinyl chloride, about 5 percent by weight ethyl acrylate and about 2 percent by weight methyl methacrylate.

* * * * *